March 3, 1942. R. G. AURIEN 2,274,857
BRAKE
Filed Jan. 2, 1940 4 Sheets-Sheet 2
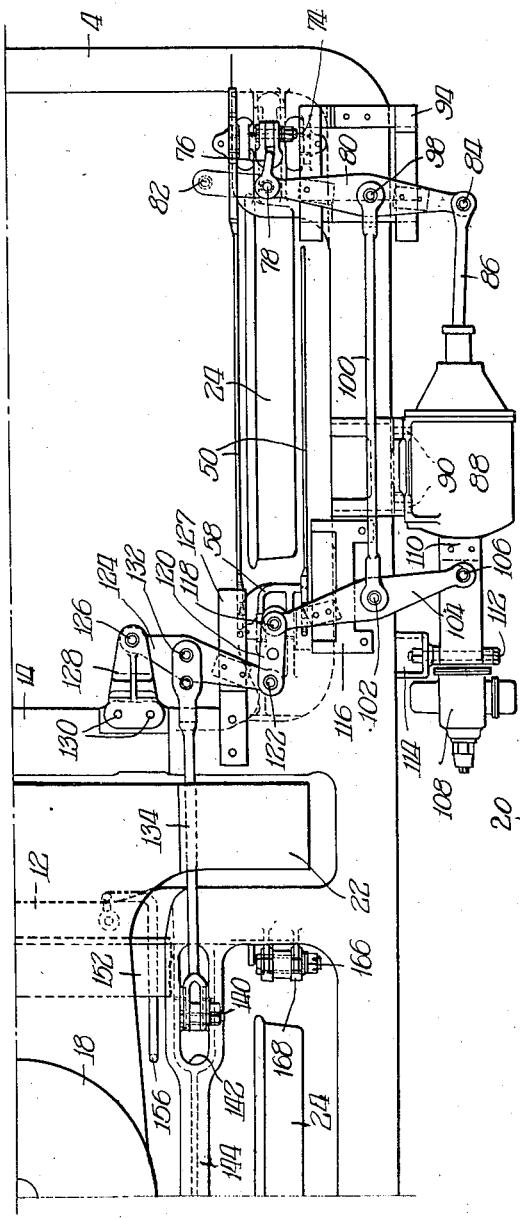
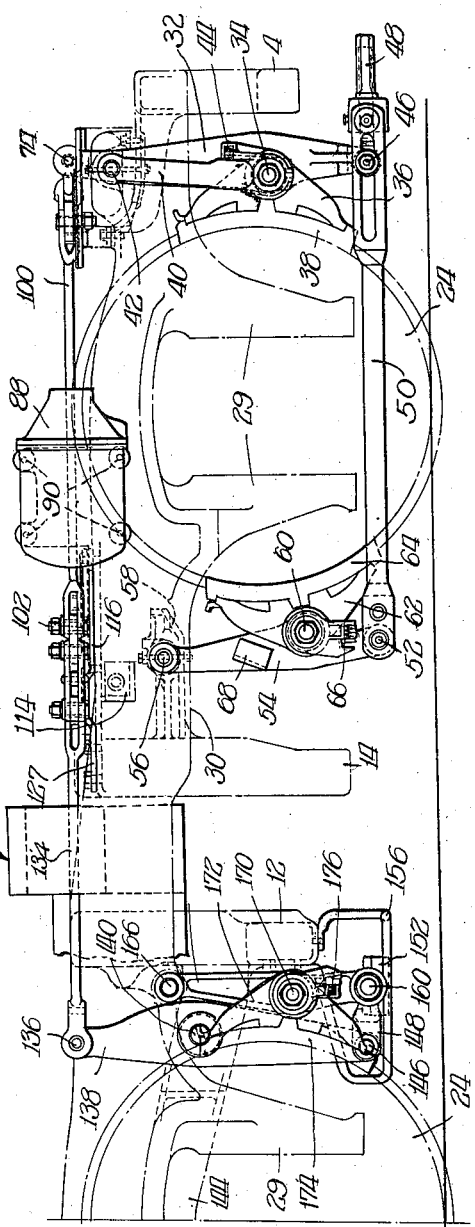
Fig. 1A
Fig. 2A
INVENTOR.
Ray G. Aurien,
BY
ATTORNEY.

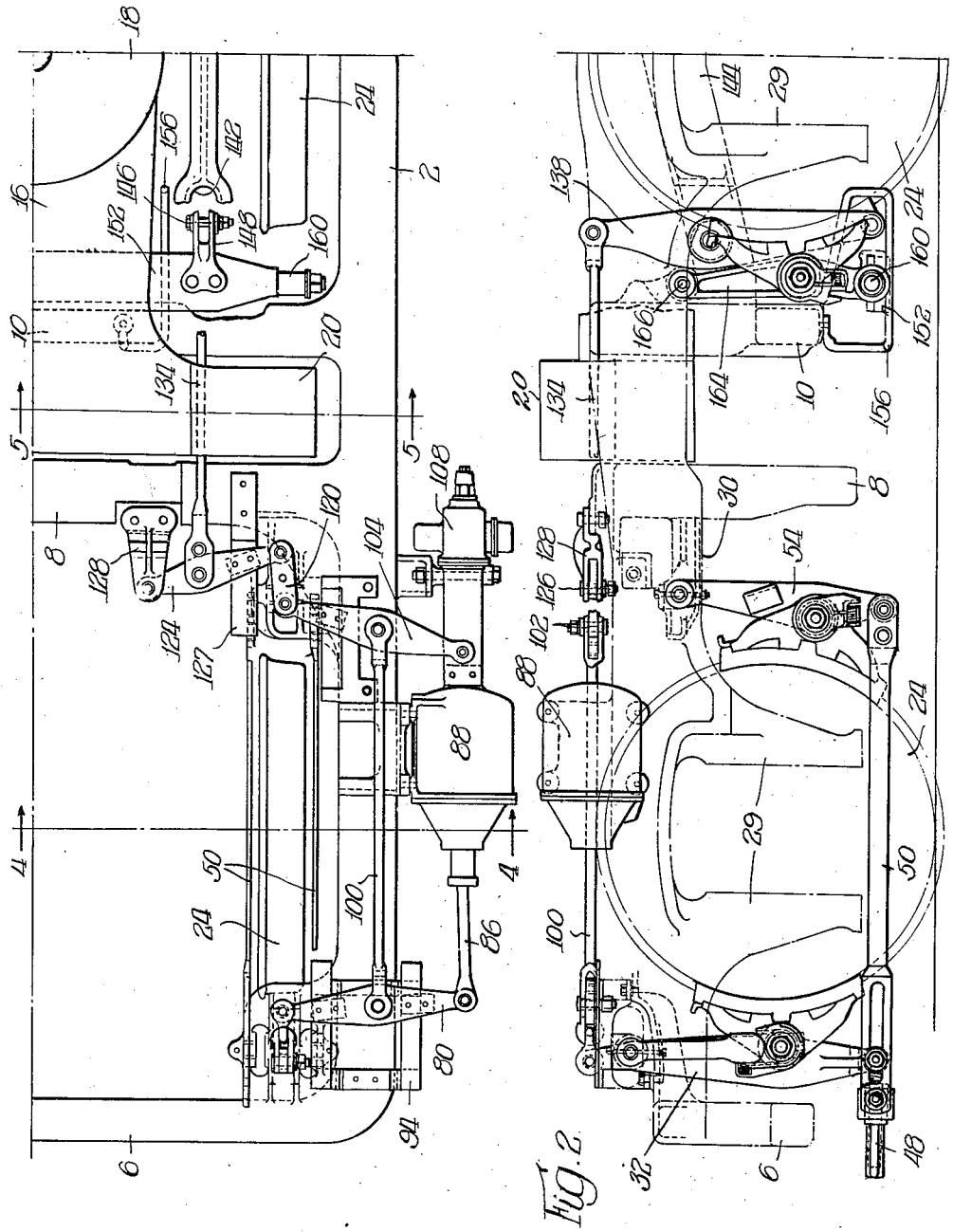

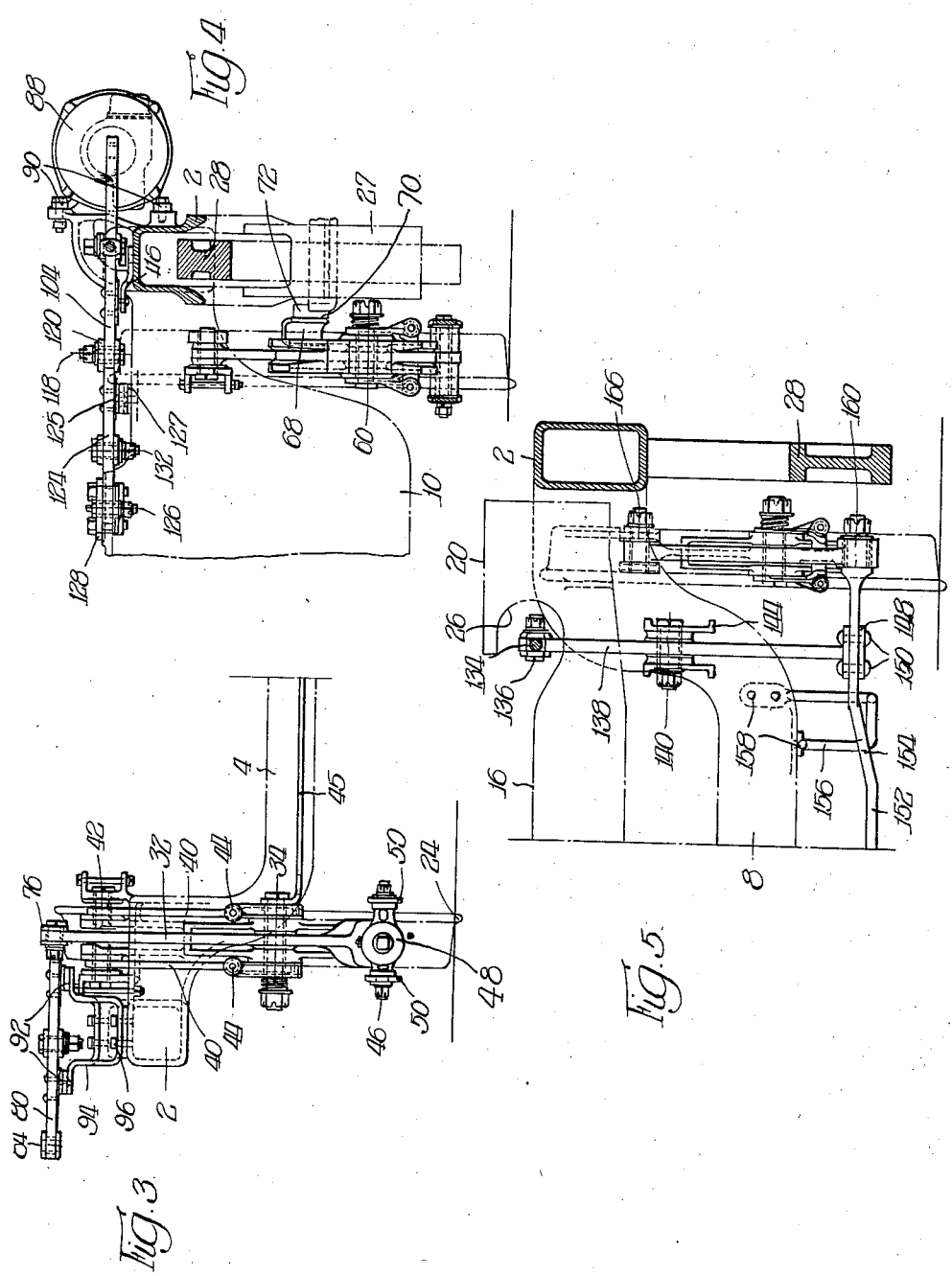

March 3, 1942. R. G. AURIEN 2,274,857
BRAKE
Filed Jan. 2, 1940 4 Sheets-Sheet 4
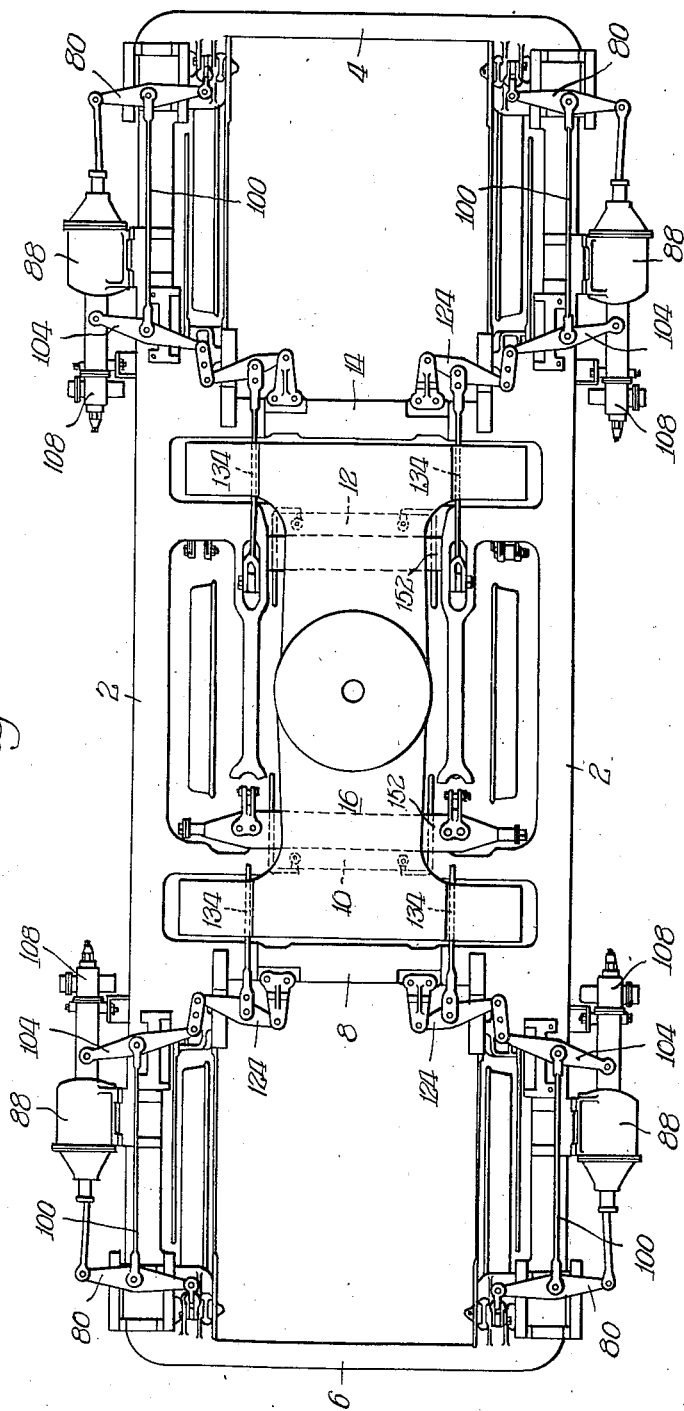
INVENTOR.
Ray G. Aurien,
BY
ATT'Y.

Patented Mar. 3, 1942

2,274,857

UNITED STATES PATENT OFFICE 2,274,857

BRAKE

Ray G. Aurien, Chicago, Ill., assignor to American Steel Foundries, Chicago, Ill., a corporation of New Jersey Application January 2, 1940, Serial No. 312,018

9 Claims. (Cl. 188—46)

My invention relates to brake rigging for a railway car truck and more particularly such an arrangement of clasp brake type wherein the power means for actuation of said brake rigging is mounted upon the truck frame. My invention contemplates an arrangement suitable for a high speed truck such as may be used for Diesel locomotives and affords the necessary clearance required in such a locomotive structure.

An object of my invention is to design a rigging suitable for a truck of a Diesel locomotive wherein the truck frame supports a span bolster, the side bearings of which are in substantial alignment with the wheels of the truck in order to secure maximum width therebetween at opposite sides of the truck and a high degree of stability.

A different object of my invention is to design a brake rigging wherein each power means will operate the rigging at one side of the truck at one end thereof, affording operating means for the rigging associated with one wheel and a portion of the rigging associated with an adjacent wheel.

My invention contemplates a rigging for such a truck as that above described wherein a plurality of power means is mounted on each side of the truck and wherein the power means at one end of the truck actuates the brake rigging associated with one wheel and axle assembly and a portion of the rigging associated with an intermediate wheel and axle assembly.

Figures 1 and 1A are top plan views showing a truck and brake structure embodying my invention, only one-half of the truck being shown inasmuch as the structure is the same at opposite sides of the truck.

Figures 2 and 2A are side elevations of the truck and brake structure shown in Figures 1 and 1A; and Figure 3 is an end elevation thereof, the view being taken from the right as seen in Figures 1A and 2A.

Figure 4 is a sectional view taken substantially in the transverse vertical plane indicated by the line 4—4 of Figures 1A and 2A.

Figure 5 is a sectional view in a transverse vertical plane substantially as indicated by the line 5—5 of Figure 1 and showing in elevation the span bolster.

Figure 6 is a top plan view of reduced size showing the complete truck and brake arrangement illustrated in Figures 1 and 2.

In the drawings certain details are omitted from various views when better shown in other views.

Describing the structure in detail, the truck is an integral structure comprising a side member 2, end rails 4 and 6 and spaced transoms 8, 10, 12 and 14 affording means of support for the span bolster 16 having the center bearing 18 and the side bearings 20 and 22, said side bearings being arranged substantially in alignment with the wheels of the supporting wheel and axle assemblies indicated at 24, 24. The side bearings are of novel form and arrangement having the configuration best seen from the end view of Figure 5 with clearance afforded as at 26 for a portion of the brake rigging hereafter more particularly described. The truck frame may be supported in a usual manner from the spaced wheel and axle assemblies as by means of equalizers 28, 28, each of said equalizers having its opposite ends supported respectively on journal boxes (not shown) associated with an end and an intermediate wheel and axle assembly, said journal boxes being supported in the pedestal jaws of the frame as indicated at 29, 29. Spring seats 27, 27 may be mounted on said equalizers in a well known manner, thus affording support for the frame structure at the spring seats indicated at 30, 30.

The brake rigging for each end of the truck is powered by a pair of cylinders located at opposite sides of the truck adjacent the end and actuating the rigging associated with an end wheel and axle assembly and one-half of the rigging associated with the adjacent side of the intermediate wheel and axle assembly. The rigging associated with the end wheel and axle assemblies is of beamless type whereas that associated with the intermediate assembly is of beam type.

The rigging associated with each power means comprises the live truck lever 32 pivotally connected intermediate its ends as at 34 to the brake head 36 having the brake shoe 38, support for said head and lever being in the form of the paired hangers 40, 40 likewise connected at the pivot point 34 and pivotally supported at their upper ends as at 42 from the truck frame. Balancing means 44, 44 for the brake head are associated with the hangers 40, 40 and the brake heads 36, 36 at opposite sides of the truck are connected by the tie strap 45. The lower end of the brake lever 32 has a pivotal and adjustable connection as at 46 through the manual slack adjuster 48 to the balanced inboard and outboard straps 50, 50, said straps extending on opposite sides of the adjacent wheel and having their opposite ends pivotally and adjustably connected as at 52 to the lower end of the hanger lever 54, the upper end of which is pivotally supported as at 56 from the bracket 58 afforded on the frame at the juncture of the adjacent transom with the side member 2. Intermediate the ends of the hanger lever 54 is pivotally connected as at 60 the brake head 62 carrying the brake shoe 64. Balancing means 66 of another well known type is afforded for the brake head 62 at its connection with the hanger lever 54. Guide means for each hanger lever 54 is in the form of an angular bracket 68 secured thereto somewhat above the pivot point 60 as best seen in the sectional view of Figure 4, the outboard end of said bracket affording bearing as at 70 against the wear plate 72 carried on the spring seat 27.

The upper end of the live truck lever 32 has a pivotal connection as at 74 to the clevis means 76, the opposite end of said clevis means having a pivotal connection as at 78 to a point intermediate the ends of the live cylinder lever 80, said live cylinder lever being extended inboard the pivot point 78 to afford a hand brake connection as at 82. The opposite end of the live cylinder lever 80 has a pivotal connection as at 84 to the piston 86 of the cylinder 88 which is supported as at 90, 90 from the side member 2. The live cylinder lever 80 is supported on wear plates at spaced points 92, 92 from the U-shaped bracket 94 which is carried as at 96 (Figure 3) on the side member 2.

Intermediate the ends of the live cylinder lever 80 is pivotally connected as at 98 the pull rod 100, the opposite end of which has a pivotal connection as at 102 to the dead cylinder lever 104, the outboard end of which is pivotally and adjustably connected as at 106 to the slack adjuster 108. One end of the slack adjuster 108 is mounted as at 110 on the cylinder of the power means 88 and at an intermediate point as at 112 support for said slack adjuster is afforded off the side member 2 by the bracket 114. Sliding support for the inboard end of the dead cylinder lever 104 is afforded by the bracket 116 carried on the side member 2. The inboard end of the live cylinder lever 104 has a pivotal and adjustable connection as at 118 to the link means 120, the opposite end of said link means having a pivotal and adjustable connection as at 122 to the dead auxiliary lever 124 which is fulcrumed at its inboard end as at 126 from the bracket 128 which is secured as at 130, 130 from the adjacent transom. The auxiliary lever 124 is afforded sliding support adjacent its outboard end as at 125 (Figure 4) from the support bracket 127 secured to the adjacent transom. The dead auxiliary lever 124 has a pivotal and adjustable connection intermediate its ends as at 132 to the pull rod 134, the opposite end of which has a pivotal connection as at 136 to the dead truck lever 138 which is fulcrumed intermediate its ends as at 140 in the slot 142 formed in the strut 144 extending between adjacent transoms inboard the wheel. The projecting side bearing portion of the center bolster 16 is given a configuration at 26 as already described to accommodate the pull rod 134 and afford clearance therefor. The lower end of the dead truck lever 138 has a pivotal connection as at 146 to the fulcrum 148 (Figure 5) which is secured as at 150 to the hanger lever connector or brake beam 152. The brake beam 152 is offset as at 154 inboard of the fulcrum 148 to afford additional clearance, and a safety support therefor is provided in the loop bracket 156 which is connected as at 158, 158 to the adjacent transom. The brake beam 152 has a pivotal connection at its trunnion end as at 160 to the lower end of the hanger lever 164, the upper end of which is pivotally hung as at 166 from the bracket 168 formed on the adjacent transom near its juncture with the side member 2. Intermediate the ends of the hanger lever 164 is pivotally supported as at 170 the brake head 172 supporting the brake shoe 174 for engagement with one side of the adjacent intermediate wheel. Balancing means for said brake head is afforded as at 176.

In operation actuation of the power means 88 causes the live cylinder lever 80 to rotate in a counterclockwise direction (Figure 1) about the pivot 98 intermediate its ends, thus rotating the live truck lever 32 in a counterclockwise direction (Figure 2) about the pivot 46 at its lower end, thus bringing the brake shoe 38 into engagement with the periphery of the adjacent wheel. As the application of power continues the live truck lever 32 rotates in a counterclockwise direction about the pivot 34 intermediate its ends, thus, through the straps 50, rotating the hanger lever 54 in a counterclockwise direction about the pivot of its upper end and bringing the brake shoe 64 into engagement with the opposite periphery of the last-mentioned wheel. Simultaneously, through the pull rod 100, the dead cylinder lever 104 is rotated in the clockwise direction (Figure 1) about the fulcrum 106, at its outer end and, through the link means 120, applies counterclockwise rotation to the dead auxiliary lever 124 about the fulcrum 126 at its inner end, so moving the pull rod 134 to the right and causing clockwise rotation (Figure 2) of the dead truck lever 138 and moving the brake beam or hanger lever connector 152 into position to apply the brake shoe 174 into engagement with the adjacent periphery of the intermediate wheel.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a railway car truck having end and intermediate wheel and axle assemblies, a truck frame having spaced transoms, a span bolster supported on said frame with side bearings substantially in longitudinal alignment with said wheels, beamless braking means associated with said end wheel and axle assemblies, beam type rigging associated with said intermediate wheel and axle assembly, power means mounted on said frame adjacent each end, each of said power means being operatively connected to an end brake rigging and to a portion of said intermediate rigging, the connections of each power means to the rigging comprising interconnected live and dead cylinder levers connected at opposite ends of said power means, an operative connection between the live cylinder lever and the end brake rigging, and an operative connection between the dead cylinder lever and the intermediate rigging, said last-mentioned operative connection comprising a pull rod extending over the adjacent spaced transoms and inboard the intervening side bearing, said side bearing being cored away to accommodate movement of said pull rod.

2. In a railway car truck having end and intermediate wheel and axle assemblies, a frame comprising side members and spaced transoms, a span bolster supported on said transoms with side bearings in longitudinal alignment with said wheels, and brake rigging independently supported at opposite ends of the truck and comprising beamless rigging associated with an end assembly, beam type rigging for one side of an intermediate assembly, and power means mounted on opposite sides of said frame adjacent said end wheels and operatively connected to the adjacent beamless rigging and beam type rigging, said operative connection comprising interconnected live and dead cylinder levers connected at opposite ends of said power means, and an operative connection between said live cylinder lever and the beamless rigging and between said dead cylinder lever and the beam type rigging, said operative connection between the dead cylinder lever and said beam type rigging comprising a single dead auxiliary lever fulcrumed from a transom and a dead truck lever fulcrumed from an adjacent transom, and a pull rod operatively connected between said dead auxiliary lever and said dead truck lever, said pull rod extending over the adjacent portion of the bolster inboard the adjacent side bearing, said bolster and side bearing being cored away to accommodate movement of said pull rod.

3. In a railway car truck having end and intermediate wheel and axle assemblies, a truck frame having spaced transoms, a span bolster supported on said frame with side bearings substantially in longitudinal alignment with said wheels between spaced transoms at each end of the truck, beamless braking means associated with said end wheel and axle assemblies, beam type rigging associated with said intermediate wheel and axle assembly, power means mounted on said frame adjacent each end, each of said power means being operatively connected to an end brake rigging and to a portion of said intermediate brake rigging, the connection of said power means to said intermediate rigging comprising a single dead auxiliary lever fulcrumed from a transom, a dead truck lever fulcrumed from an adjacent transom, and a pull rod connecting said last-mentioned levers, said pull rod extending over spaced transoms inboard the intervening side bearing and over an adjacent portion of said bolster, said side bearing and bolster being cored away to accommodate vertical and lateral play of said pull rod.

4. In a railway car truck having end and intermediate wheel and axle assemblies, a frame including integral side members and spaced transoms, a span bolster supported on said transoms with side bearings substantially in longitudinal alignment with said wheels between spaced transoms at each end of the truck, power means mounted on said side members at opposite sides of the truck adjacent each end thereof, beamless rigging associated with each end assembly, beam type rigging associated with said intermediate assembly, and an operative connection between the power means at each end of the truck and the adjacent beamless rigging and a portion of said beam type rigging, the operative connection between the power means and the beam type rigging at each end of the truck comprising a pull rod at each side of the truck extending over spaced transoms and an intervening portion of said bolster inboard the adjacent side bearing, said side bearing and bolster being cored away to accommodate normal movements of said pull rod under operating conditions.

5. In a railway car truck, a frame comprising integral side members and spaced transoms, end and intermediate wheel and axle assemblies, a strut member connecting adjacent transoms adjacent each intermediate wheel, a span bolster, spaced side bearings on said bolster intervening between spaced transoms at each end of the truck in substantial longitudinal alignment with the wheels, beam type rigging associated with said intermediate assembly, beamless rigging associated with said end assemblies, and power means mounted on each end of the truck at each side thereof and operatively connected to said beamless and beam type rigging for opposite ends of the truck respectively, the connections between the power means at each end of the truck and the beam type rigging comprising dead truck levers fulcrumed from said strut members at each side of the truck, and pull rods connected to said dead truck levers and extending over spaced transoms and portions of said bolster inboard the adjacent intervening side bearings at each side of the truck, said side bearings and bolster being cored away to accommodate movements of said pull rod.

6. In a brake arrangement for a six wheel railway car truck, a frame comprising spaced transoms at each end of the truck, spaced supporting wheel and axle assemblies, a span bolster with side bearings interposed between said spaced transoms in longitudinal alignment with the wheels, and brake rigging for each end of the truck comprising dead truck levers fulcrumed from a transom at each side of the truck, a single dead auxiliary lever fulcrumed from an adjacent transom at each side of the truck, and a pull rod connecting the truck lever and auxiliary lever at each side of the truck, said pull rod extending over said transoms and a portion of said bolster inboard the adjacent side bearing, said bolster and side bearing being cored away to accommodate operating movements of said pull rod.

7. In a brake arrangement for a six wheel railway car truck, a frame comprising spaced transoms at each end of the truck, spaced supporting wheel and axle assemblies, a span bolster with side bearings intervening between the transoms at each end of the truck in longitudinal alignment with the wheels, and brake rigging including a dead truck lever fulcrumed from a transom at one end of the truck, a single dead auxiliary lever fulcrumed from an adjacent transom, and a pull rod extending over said transoms and over a portion of said bolster inboard the intervening side bearing, said bolster and side bearing being cored away to accommodate normal lateral and longitudinal play of said pull rod under operating conditions.

8. In a brake arrangement for a six wheel railway car truck, a frame comprising spaced transoms at each end of the truck, a span bolster with side bearings intervening between said spaced transoms in longitudinal alignment with the wheels, beamless rigging for an end wheel and axle assembly, beam type rigging associated with the intermediate wheel and axle assembly, and connections between the beam and beamless rigging at each end of the truck comprising pull rods extending over adjacent transoms and over portions of said bolster inboard the adjacent side bearings, said side bearings and bolster being cored away to accommodate normal play of said pull rods under operating conditions.

9. In a brake arrangement for a six wheel truck, a frame comprising spaced transoms at each end of the truck, supporting wheel and axle assemblies, a span bolster with side bearings intervening between the transoms at each end of the truck in longitudinal alignment with the wheels, and brake rigging for each end of the truck comprising a single auxiliary lever fulcrumed from an end transom at each side of the truck, truck levers fulcrumed from an adjacent transom, and a pull rod connecting the auxiliary lever and truck lever at each side of the truck, said pull rods extending over said transoms and over portions of said bolster inboard the intervening side bearings, said side bearings and bolster being cored away to accommodate movements of said pull rods.

RAY G. AURIEN.